(12) United States Patent
Youn

(10) Patent No.: US 7,048,180 B2
(45) Date of Patent: May 23, 2006

(54) CUSTOMER ACCESS MODULE FOR A MEDIA DISPENSER

(75) Inventor: Ki-cho Youn, Seoul (KR)

(73) Assignee: LG N-Sys Inc., Seoul (KR)

( * ) Notice: Subject to any disclaimer, the term of this patent is extended or adjusted under 35 U.S.C. 154(b) by 168 days.

(21) Appl. No.: 10/720,390

(22) Filed: Nov. 25, 2003

(65) Prior Publication Data
US 2004/0108328 A1    Jun. 10, 2004

(30) Foreign Application Priority Data
Nov. 30, 2002  (KR) .................. 10-2002-0075676

(51) Int. Cl.
*G06Q 40/00*  (2006.01)
(52) U.S. Cl. .................... 235/379; 705/43
(58) Field of Classification Search ........... 235/379; 902/8, 9; 705/43
See application file for complete search history.

(56) References Cited

U.S. PATENT DOCUMENTS

| | | | |
|---|---|---|---|
| 3,715,569 A * | 2/1973 | Hicks et al. ............. | 235/381 |
| 4,754,126 A * | 6/1988 | Caldwell ................. | 235/379 |
| 5,597,996 A * | 1/1997 | Flood ..................... | 235/379 |
| 6,276,603 B1 * | 8/2001 | Patterson ............... | 235/379 |
| 6,328,208 B1 * | 12/2001 | Artino et al. ........... | 235/379 |

FOREIGN PATENT DOCUMENTS

KR    1020020075552    10/2002

* cited by examiner

*Primary Examiner*—Seung H Lee
(74) *Attorney, Agent, or Firm*—Fleshner & Kim, LLP

(57) ABSTRACT

A customer access module is provided for a media dispenser. The customer access module includes an accumulation box or receptacle used to accumulate media in the customer access module. The accumulation box or receptacle is rotatably installed to rotate through 360 degrees and includes first and second accumulation surfaces as well as an accumulation space. The accumulation space is in communication with the outside through an opening. The second accumulation surface has a width w smaller than a width of the media and is disposed adjacent to an edge of one side of the opening. The accumulation box or receptacle is rotated about an axis passing through centers of both side ends thereof and receives a driving force from a motor through a driving belt. A collector box or receptacle is installed below the accumulation box so as to collect the media that have not been taken by a customer. With a customer access module so constructed, a small load can be applied to the motor to rotate the accumulation box about an axis passing through the centers of both side ends thereof through 360 degrees. Even when a small number of sheets of media are stacked on the accumulation box, media can also be thoroughly discharged into the collector box.

23 Claims, 14 Drawing Sheets

CUSTOMER ACCESS MODULE FOR A MEDIA DISPENSER

BACKGROUND OF THE INVENTION

1. Field of the Invention

The invention relates to a media dispenser, and more particularly, to a customer access module for a media dispenser.

2. Background of the Related Art

A term "media" is used herein to represent, for example, bills, checks, tickets, certificates, etc. That is, a variety of media for which thickness is very small compared with a width or length thereof.

FIG. 1 is a side view of a related art customer access module for a media dispenser. Referring to FIG. 1, the media dispenser 1 comprises a media storage box or receptacle (not shown), a feed module (not shown) configured to draw media M out from the media storage box and transfer the drawn media away therefrom, a delivery module 3 configured to transfer the media M that have passed out from the feed module, and a customer access module 10 configured to collect the media M that have passed through the delivery module 3 and transfer the collected media to a customer. Feed rollers 5 and belts 7 are used in the delivery module 3 and the feed module (not shown) to transfer the media.

The customer access module 10 includes a frame 12 which may be integrally formed with a frame of the media dispenser 1. The frame 12 defines an inner space within the customer access module 10. A door 14 is mounted to the frame 12 and functions to selectively cover the inner space. That is, the door 14 selectively covers an entrance 13 formed on a front surface of the customer access module 10.

The door 14 is driven by a door motor 15 installed at a center of rotation thereof. The door motor 15 rotates in a forward and reverse direction so as to cause the door 14 to be opened and closed.

A base tray 16 is mounted in the inner space. The base tray 16 is in the shape of a generally rectangular plate and is mounted on the frame 12 such that one end thereof can be pivoted on a hinge shaft 17. The base tray 16 is provided with a driving protrusion 17' in the middle of one or both side ends thereof. The driving protrusion 17' is guided along a guide channel 18 formed on the frame 12.

A tray motor 20 is configured to drive the base tray 16 provided on the frame 12. A driving gear 21 is provided on a rotary shaft of the tray motor 20 and a driven gear 22 is engaged with the driving gear 21. A driving link 24 is mounted to the driven gear 22. The driving link 24 is rotated when one end thereof is concentric with the center of rotation of the driven gear 22. An interlocking slot 24' in which the driving protrusion 17' of the base tray 16 is inserted and guided is formed at the other end of the driving link 24. Alternatively, the structures for driving the base tray 16 may be provided at both side ends of the base tray 16.

A collector box or receptacle 26 configured to collect the returned media M therein is provided at a lower portion of the customer access module 10. The collector box 26 receives the media M which has been transferred to the base tray 16 but not taken by a customer.

Reference numeral 28 designates a sensor configured to detect an initial position of the base tray 16, or a position to which the base tray 16 is returned (to its initial position) after emptying the media M from the base tray 16 into the collector box 26. Reference numeral 28' designates a sensor configured to detect a state where the base tray 16 has been fully rotated to transfer the media M into the collector box 26.

The related art customer access module so constructed is operated as follows.

As shown in FIGS. 2A to 2E, the media M that have been transferred from the media storage box through the feed module and the delivery module 3 are stacked onto the base tray 16. When a desired number of sheets of the media M is stacked onto the base tray 16, the door motor 15 is operated to open the door 14, as is shown in FIG. 2B. If the door 14 is rotated and raised upward, the entrance 13 is in an open state and thus a hand of the customer can access the media M stacked on the base tray 16.

However, if the customer does not take the media M stacked on the base tray 16 within a given period of time, the door 14 is closed, as shown in FIG. 2C. Then, the media M stacked onto the base tray 16 are transferred to the collector box 26.

That is, after the door 14 is closed, the tray motor 20 is operated, and the driving link 24 is rotated counterclockwise, causing the base tray 16 to be rotated about the hinge shaft 17. At this time, as the driving link 24 is moved, the driving protrusion 17' is moved simultaneously along the interlocking slot 24' and the guide channel 18, thus causing the base tray 16 to be rotated.

The base tray 16 is continuously rotated until detected by the sensor 28'. As a result, the media M fall down into the collector box 26, as shown in FIG. 2D. If the base tray 16 is detected by the sensor 28', the tray motor 20 begins to be operated in an opposite direction.

As the tray motor 20 is operated in the opposite direction, the base tray 16 is rotated counterclockwise until detected by the sensor 28. Such a state is shown in FIG. 2E and corresponds to a state in which the media M can again be transferred through the feed module and the delivery module 3.

However, there are the following problems in the related art customer access module described above.

As shown in FIG. 2D, the base tray 16 does not extend perpendicular to an opening of the collector box 26, even though the base tray 16 is fully rotated, when it empties the media M into the collector box 26. Therefore, there is a problem in that at least one or two sheets of media M may not be transferred to the collector box 26 but may remain attached to the base tray 16. This is because the angle of rotation of the base tray 16 is restricted within the customer access module 10 since the center of rotation thereof is located at a front end of the base tray 16.

Further, the base tray 16 is shaped as a plate with a predetermined surface area and is pivoted on the hinge shaft 17 provided on the frame 12, while the driving protrusion 17' is guided along the guide channel 18 of the frame 12 and the interlocking slot 24' of the driving link 24. If the driving protrusion 17' is caught on the guide channel 18 and the interlocking slot 24', the base tray 16 may be distorted and/or a large load may be exerted on the tray motor 15 and the gears 21 and 22. If such a large load is exerted on the tray motor 15 and the gears 21 and 22, the smooth motion of the base tray 16 may not occur. In a worst scenario, the gears 21 and 22 and the tray motor 15 may be broken.

Further, the apparatus may be provided with a damper capable of reducing or alleviating the instantaneous load by adjusting the gear ratio. However, the durability of the gears 21 and 22 may be greatly deteriorated.

SUMMARY OF THE INVENTION

An object of the invention is to substantially solve at least one or more of the above problems and/or disadvantages in a whole or in part and to provide at least the advantages described therein.

In order to achieve at least the above objects in a whole or in part and in accordance with the purposes of the invention, as embodied and broadly described, there is provided a customer access module for a media dispenser comprising a frame defining an inner space, an accumulation receptacle rotatably installed within the space in the frame and comprising an opening configured to receive media therethrough and at least one surface on which media are stacked, and a driving source for providing a driving force for driving the accumulation receptacle.

To further achieve at least the above objects in a whole or in part and in accordance with the purposes of the invention, as embodied and broadly described, there is provided a customer access module for a media dispenser comprising a frame defining an inner space, an accumulation receptacle rotatably installed within the space in the frame and comprising an opening configured to receive media therethrough, a first accumulation surface on which media are initially stacked, and a second accumulation surface facing the first accumulation surface at a predetermined angle with respect thereto, wherein the second surface is configured to prevent unauthorized access to the media disposed on the first accumulation surface, and a driving unit configured to rotate the accumulation receptacle.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
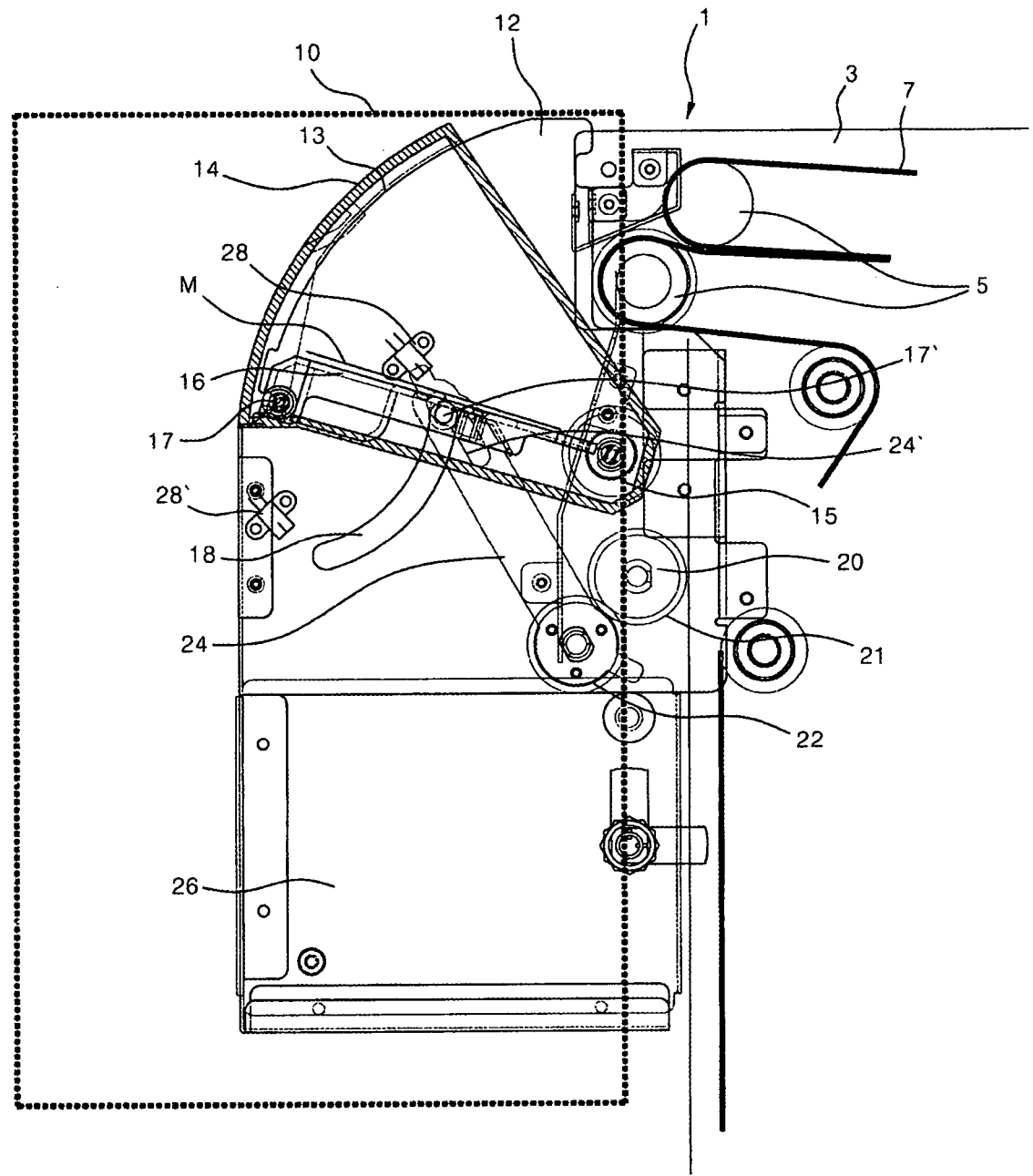
FIG. 1 is a side view of a related art customer access module for a media dispenser.
Figure 2A:
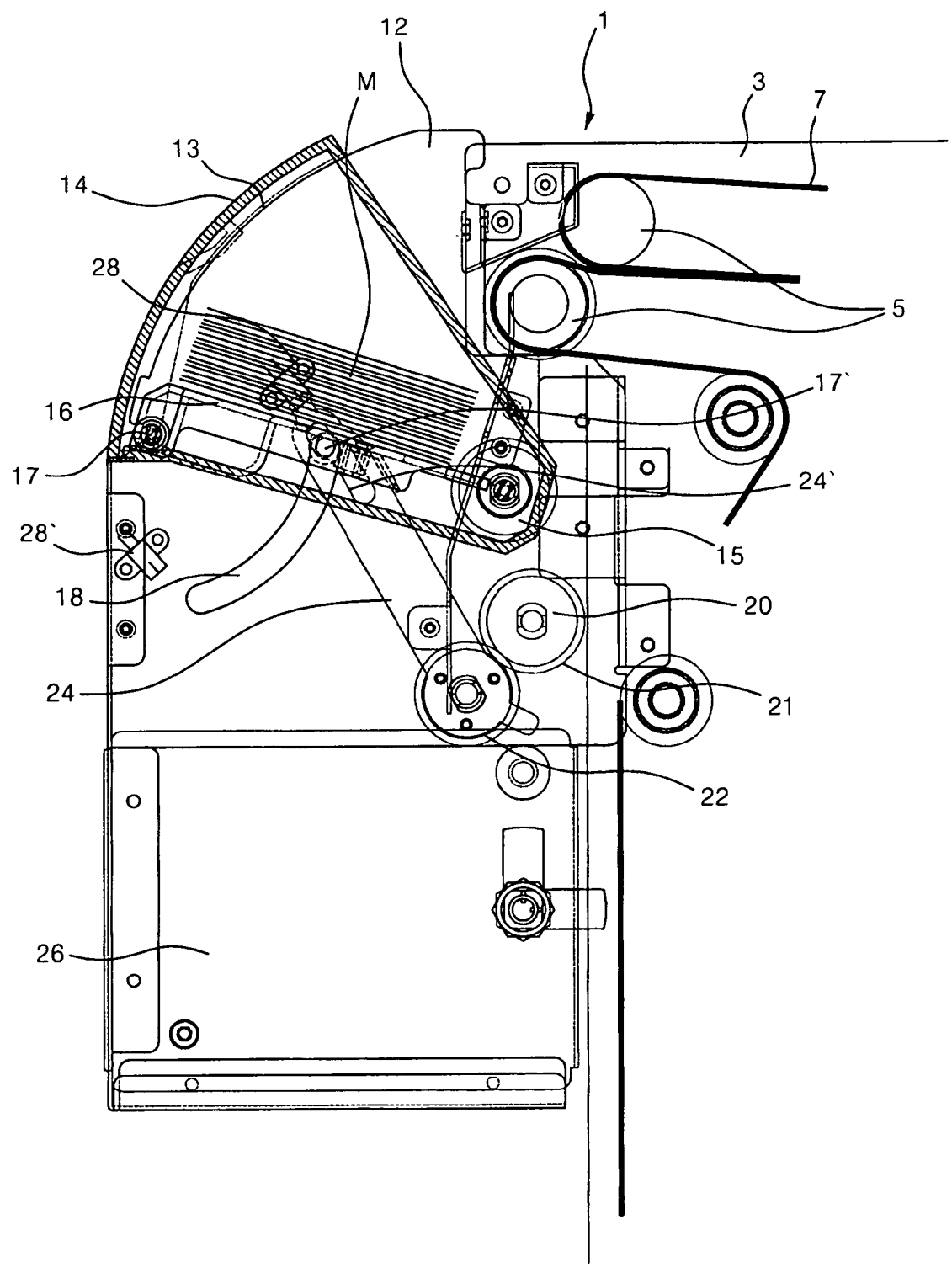
FIGS. 2A to 2E are side views showing sequential operations of the related art customer access module for a media dispenser.
Figure 2B:
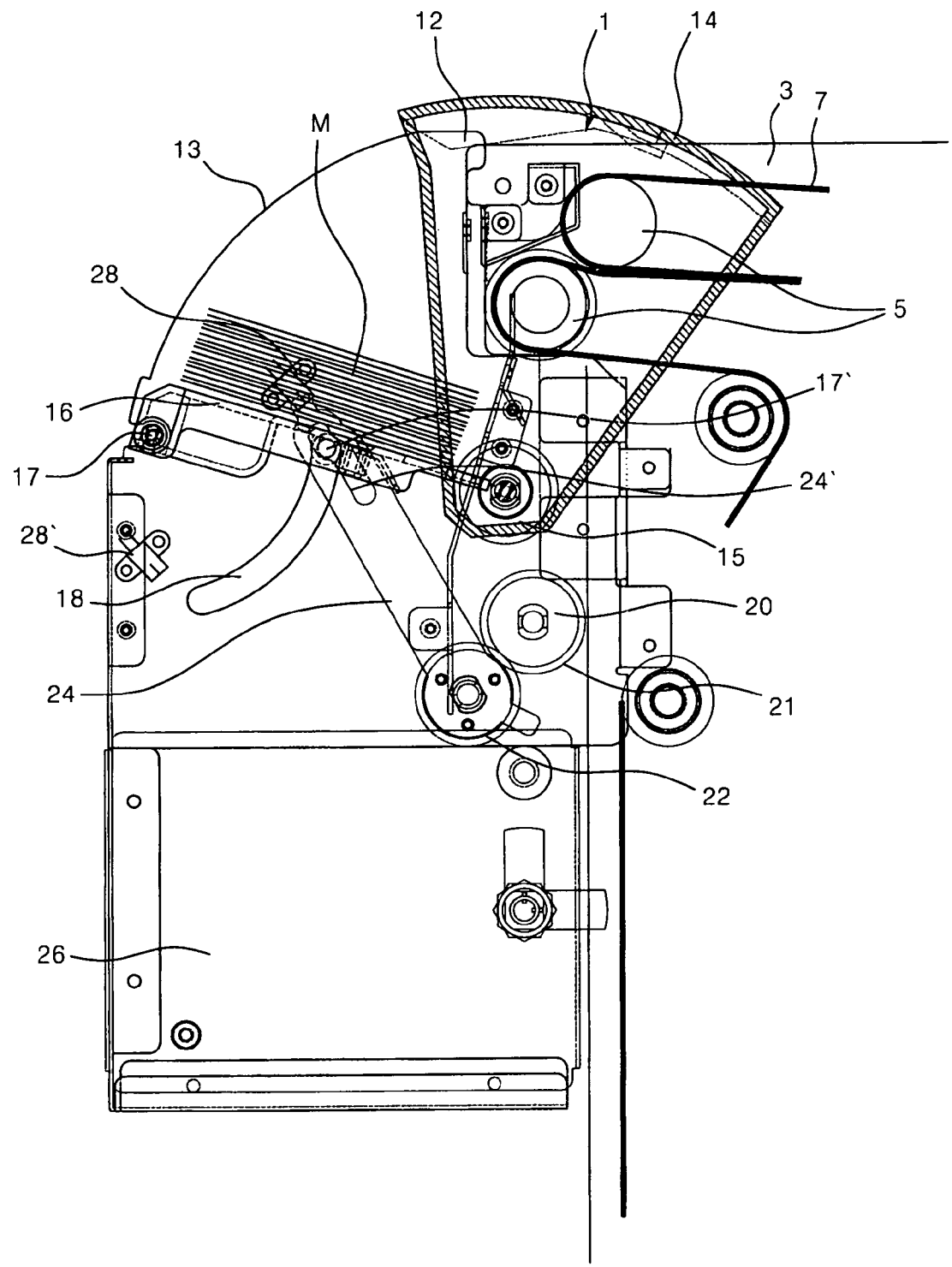
Figure 2C:
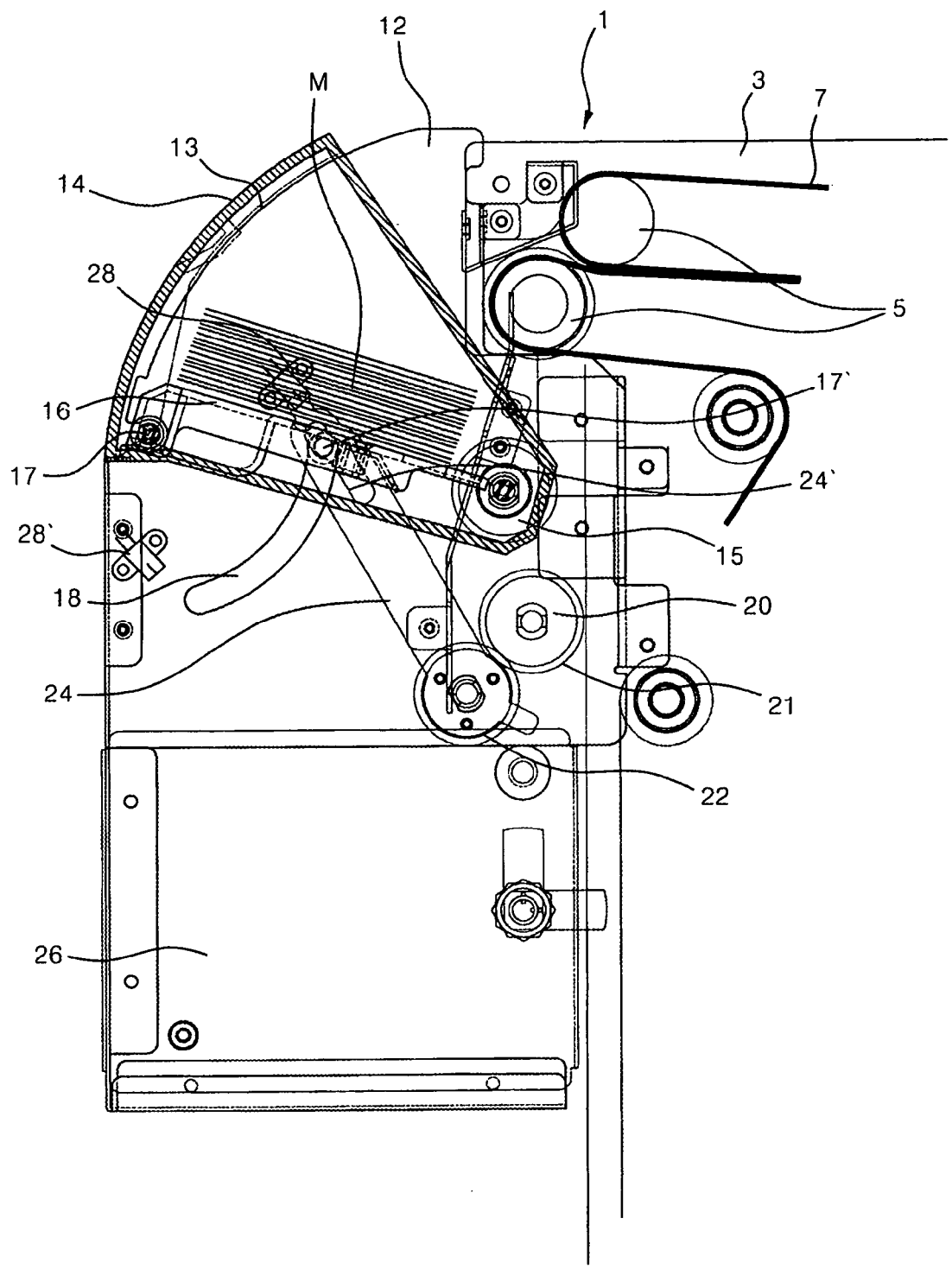
Figure 2D:
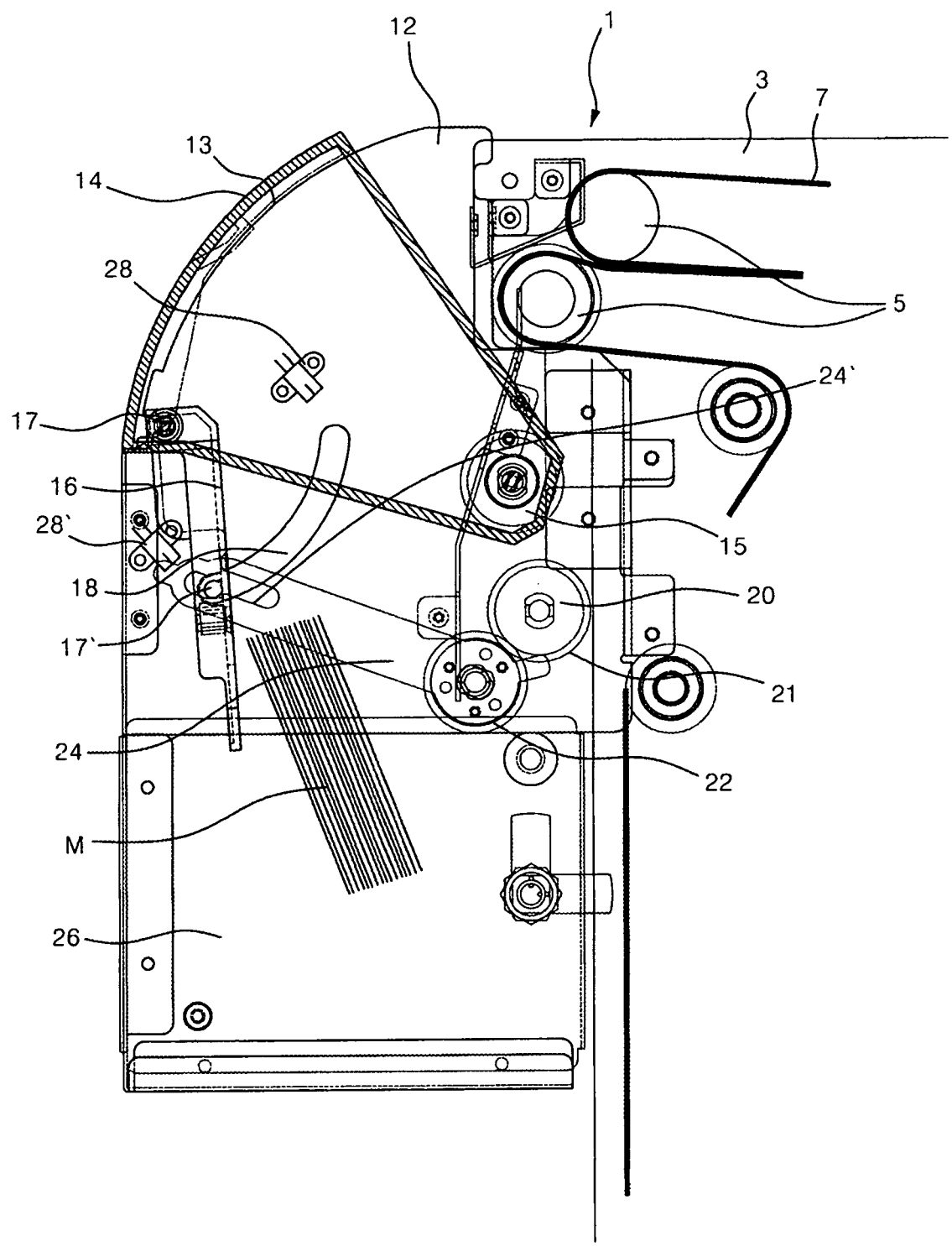
Figure 2E:
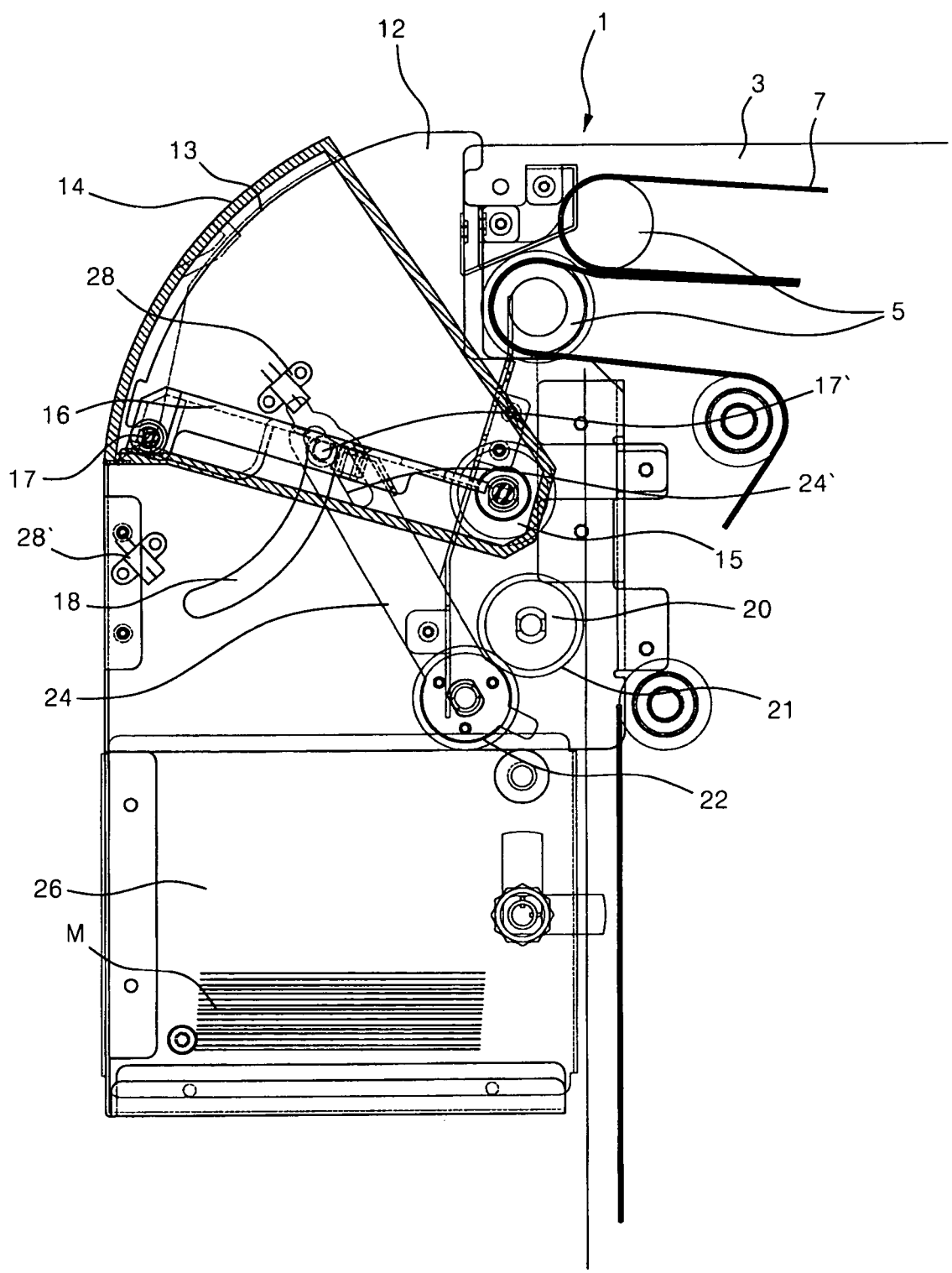

Hereinafter, the configuration of a preferred embodiment of a customer access module for a media dispenser according to the invention will be described in detail with reference to the accompanying drawings, in which like reference numerals have been utilized to indicate like elements.

Figure 3:
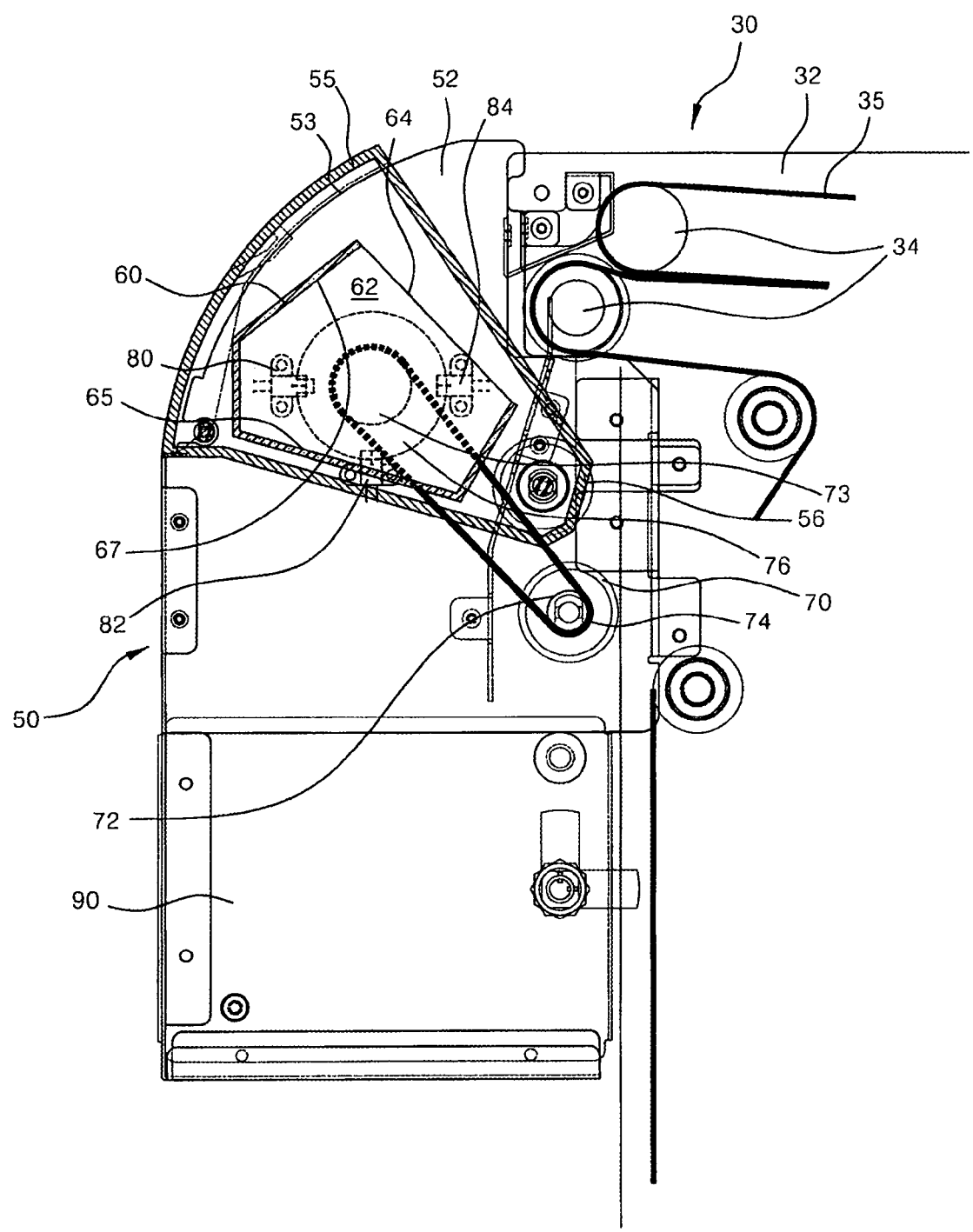
FIG. 3 is a schematic side view of an embodiment of a customer access module for a media dispenser according to an embodiment of the invention.
Figure 4:
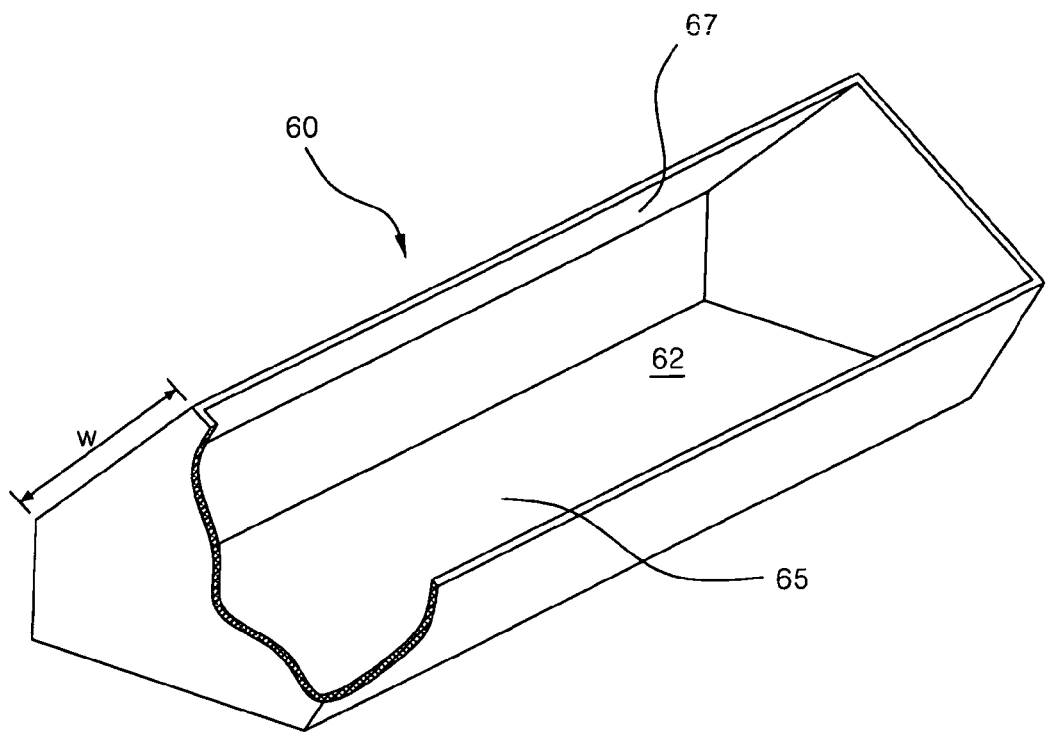
FIG. 4 is a schematic partial cut-away perspective view of an accumulation receptacle according to an embodiment of the invention.

FIG. 3 is a schematic side view of a customer access module for a media dispenser according to an embodiment of the invention, while FIG. 4 is a schematic partially cut-away perspective view of an accumulation box or receptacle according to an embodiment of the invention.

Referring to FIGS. 3 and 4, a customer access module 50 is installed at a front end of a media dispenser 30. The media dispenser 30 is provided with a media storage unit (not shown) in which media M are stored, a feed module (not shown) and a delivery module 32 that function to draw out and transfer the media M stored in the media storage unit. Feed rollers 34 and belts 35, for example, may be used to transfer the media M in the feed module (not shown) and the delivery module 32.

The customer access module 50 receives media M requested by a customer through the feed module (not shown) and the delivery module 32 so that the customer can take the media M from the customer access module 50. The customer access module 50 includes a frame 52. The frame 52 may comprise plate-shaped members placed at both side ends of the customer access module 50, defining a predetermined space therebetween. A variety of parts are installed on the frame 52 and in the space formed therebetween.

An entrance 53 is formed at an upper portion of a front end of the frame 52. The entrance 53 allows an interior of the customer access module 50 to communicate with an exterior of the media dispenser 30.

The entrance 53 is configured to be selectively opened and closed by a door 55. The door 55 is driven by a door motor 56. The door motor 56 is installed at a side of the frame 52 and causes the door 55 to move toward a top of the frame 52 so that the entrance 53 can be in the open state.

An accumulation box or receptacle 60 is installed within the space defined by the frame 52 adjacent the entrance 53. The accumulation box or receptacle 60 according to an embodiment of the invention is shown in FIG. 4. An accumulation space 62 is defined within and by the accumulation box 60. Media M transferred through the delivery module 32 are seated and stacked in the accumulation space 62. The accumulation space 62 of the accumulation box or receptacle 60 can be exposed to the outside through an opening 64. The opening 64 is formed to have a width and length at least larger than a width and length of the media M. This is to facilitate smooth entry of the media M into the accumulation space 62.

Further, in the embodiment of FIG. 3, the accumulation box or receptacle 60 is in the form of a 7-sided body having a cross section of a pentagon, as shown in FIG. 3. The opening 64 corresponds to an upwardly opened portion of the 7-sided body when the accumulation box 60 is in a media-receiving position adjacent feeding path for the media M from the delivery module 32.

A bottom surface of the accumulation space 62 of the accumulation box or receptacle 60 functions as a first accumulation surface 65. The media M transferred through the delivery module 32 are directly seated and stacked on the first accumulation surface 65. In this embodiment, the width and length of the first accumulation surface 65 is configured to be larger than a width and length of the media M.

A second accumulation surface 67 faces the first accumulation surface 65 at a predetermined angle and is adjacent to an edge of the opening 64. The second accumulation surface 67 is a surface on which the media M are seated when the accumulation box 60 is rotated and the box opening 64 is directed toward the entrance 53. The width w of the second accumulation surface 67 is formed to be smaller than a width of the media M. The second accumulation surface 67 functions to protect the accumulation box 60 from unauthorized access 60 when the accumulation box 60 is in the media receiving position and in the case, for example, that the door 55 malfunctions and is inadvertently left open or in the case that the door 55 is pried open.

A driving force for rotating the accumulation box 60 is provided by a motor 70. The motor 70 is installed on the frame 52 and the driving force from the motor 70 is transmitted to the accumulation box 60 through a belt mechanism 61. That is, the belt mechanism 61 comprises a driving pulley 72 installed on a rotary shaft of the motor 70 and a driven pulley 73 installed on one side end of the accumulation box 60 so as to be concentric with a center of the side ends of the accumulation box 60. A driving belt 74 is wound around the driving and driven pulleys 72 and 73.

Meanwhile, a wheel 76 is installed so as to be concentric with the driven pulley 73. A slot (not shown) is formed in a periphery of the wheel 76. Sensors 80, 82 and 84 are configured to detect a degree of rotation of the accumulation box 60 by sensing the slot formed in the wheel 76. The sensors 80, 82 and 84 are fixedly installed at one side of the frame 52.

The sensor 80 detects an initial position of the accumulation box 60, i.e., the initial position in which the opening 64 is directed toward the delivery module 32 from which the media M are transferred. The sensor 82 detects the position of the accumulation box 60 in which a customer can withdraw the media M stacked on the second accumulation surface 67 from the accumulation box 60, i.e., the position of the accumulation box 60 in which the box opening 64 is directed toward the entrance 53. The sensor 84 detects the position of the accumulation box 60 in which the box opening 64 is directed toward a collector box or receptacle 90, as described below.

The collector box or receptacle 90 is installed below the customer access module 50. An opening 91 is formed at a top of the collector box 90. The collector box 90 receives media M that the customer has not taken through the opening 91.

The operation of a customer access module for the media dispenser according to an embodiment of the invention will be hereinafter described in detail.

FIGS. 5A to 5F show sequential operations of a customer access module according to an embodiment of the invention. The operation of the customer access module 50 according to an embodiment of the invention will be explained with reference to FIGS. 5A to 5F.

Figure 5A:
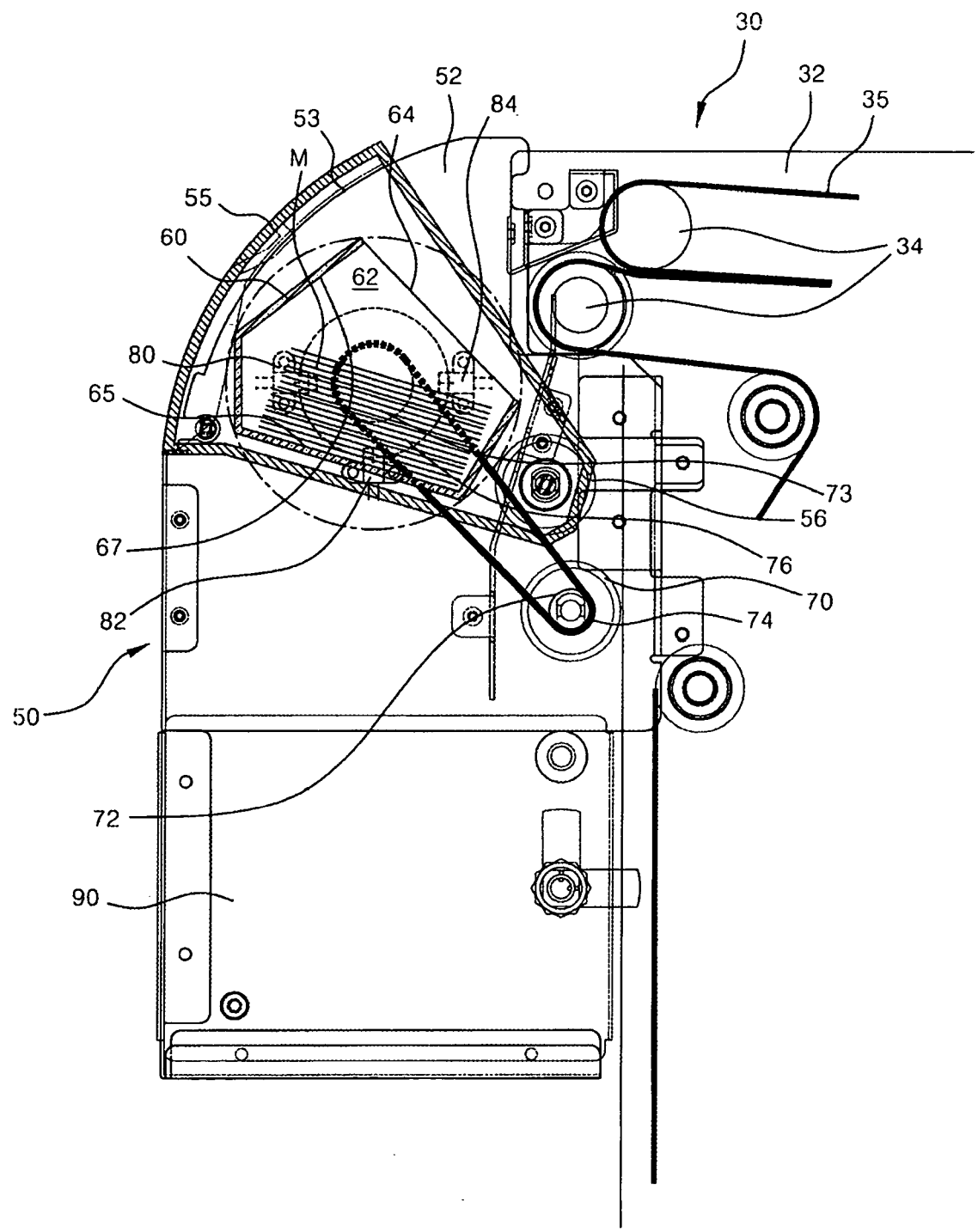
FIGS. 5A to 5F are schematic views showing sequential operation of a customer access module for the media dispenser according to an embodiment of the invention.

First, in a state as shown in FIG. 5A, the door 55 covers the entrance 53. Media M are transferred from the delivery module 32, pass through the opening 64, and are then stacked on the first accumulation surface 65. Such an operation is continuously performed until a desired number of sheets of media M are stacked on the first accumulation surface 65. In this state, the slot of the wheel 76 is located at a position corresponding to the sensor 80, and thus, the sensor 80 detects that the accumulation box 60 is in the initial state.

Figure 5B:
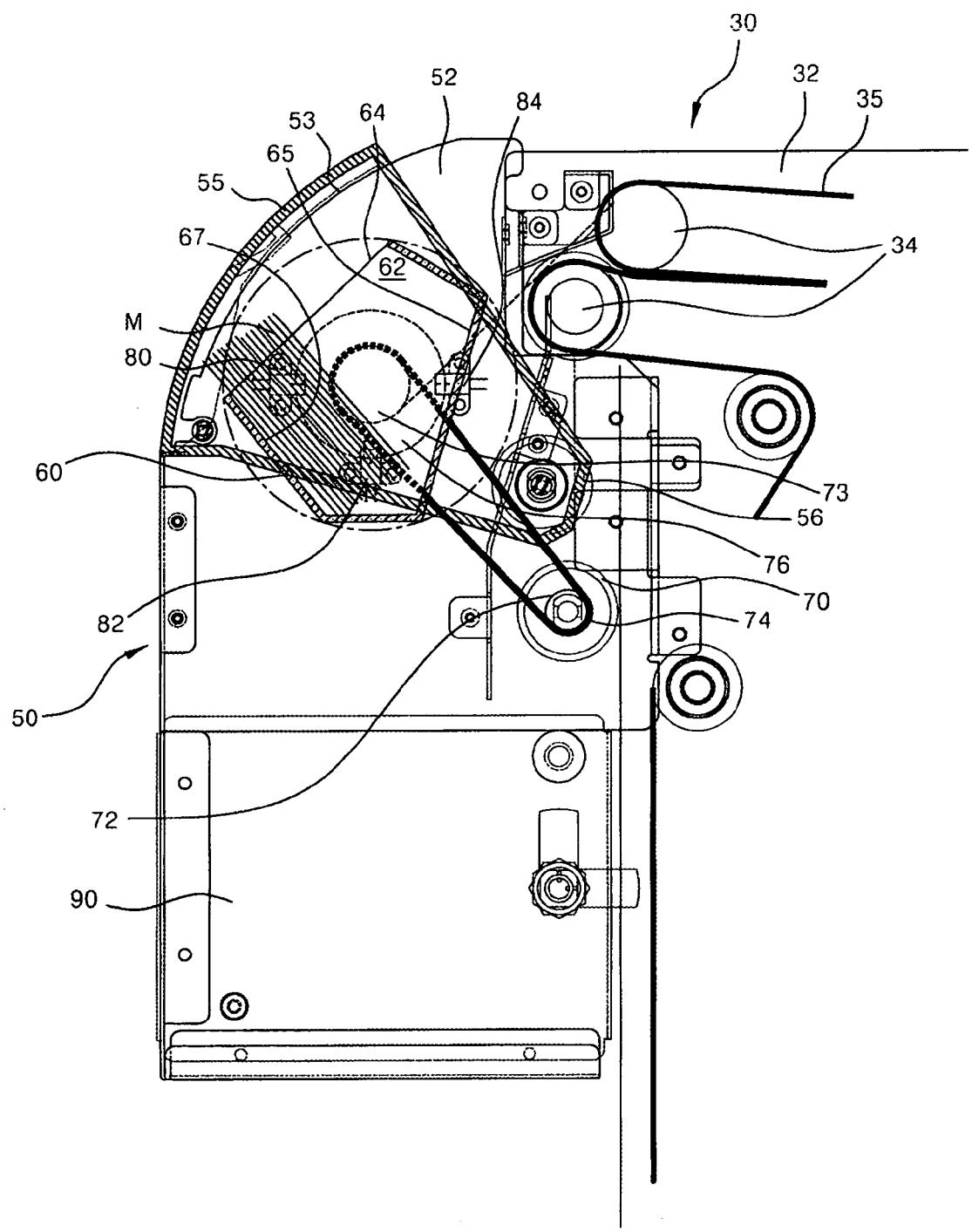

When a number of sheets of media M desired by the customer is stacked on the first accumulation surface 65, the accumulation box 60 is rotated by driving the motor 70. At this time, the accumulation box 60 is rotated through 90 degrees counterclockwise, as viewed in FIG. 5B. In this state, the opening 64 of the accumulation box 60 is directed toward the entrance 53, and the media M are seated on the second accumulation surface 67 due to the rotation of the accumulation box 60, as shown in FIG. 5B. In this state, lateral sides of the media M are directed toward the entrance 53. Since the media M has a width larger than a width w of the second accumulation surface 67, the media M protrudes through the opening 64. In this position, the sensor 82 detects the slot of the wheel 76.

Figure 5C:
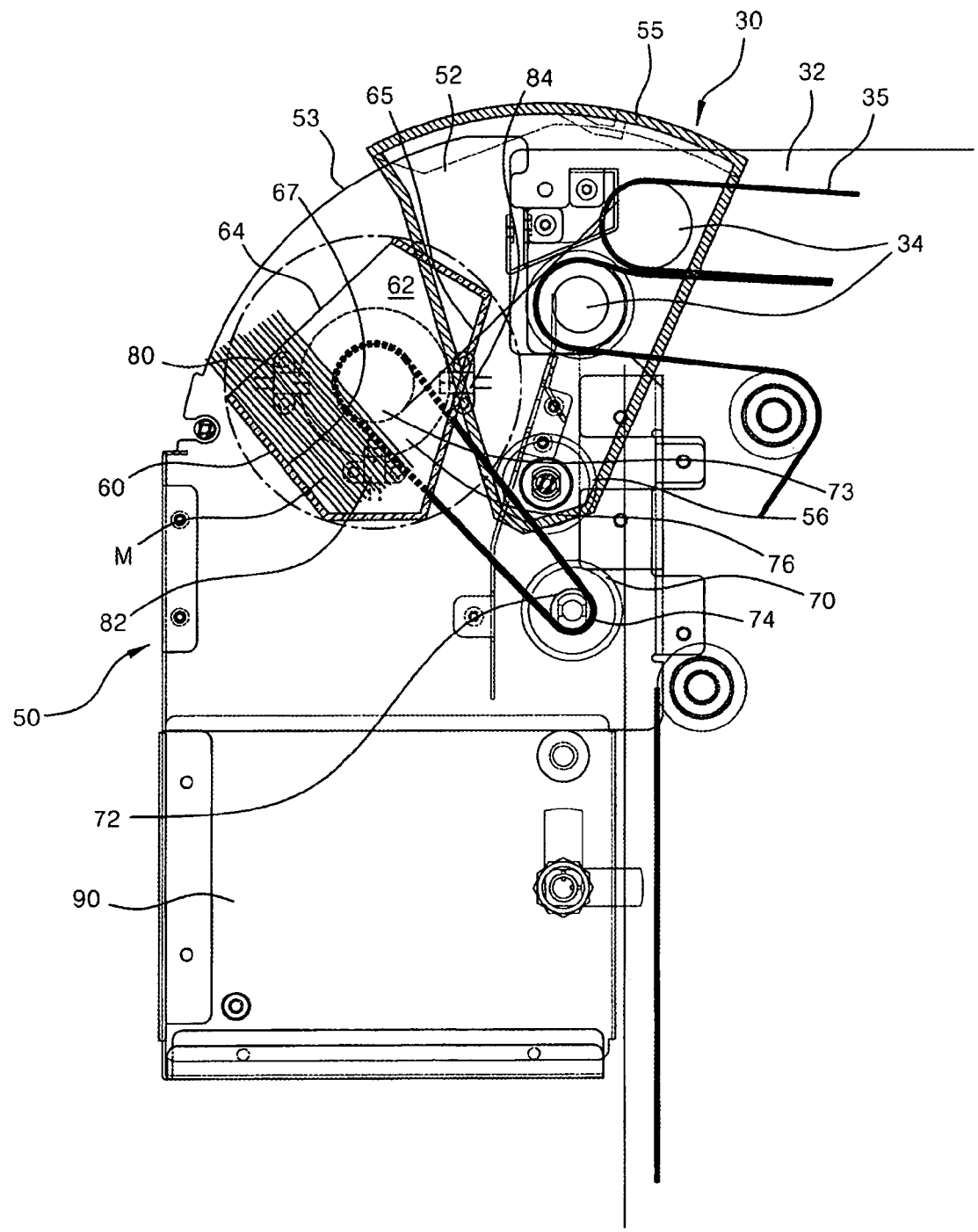

After the accumulation box 60 has been rotated, the door 55 is opened so that the entrance 53 is in an open state. That is, the door motor 56 is operated to cause the door 55 to move toward a top of the frame 52 so that the entrance 53 is open, as shown in FIG. 5C. In this state, the media M protrudes such that the lateral sides are exposed to the outside through the opening 64 of the accumulation box 60, and thus, the customer can take the media M from the accumulation box 60.

Figure 5D:
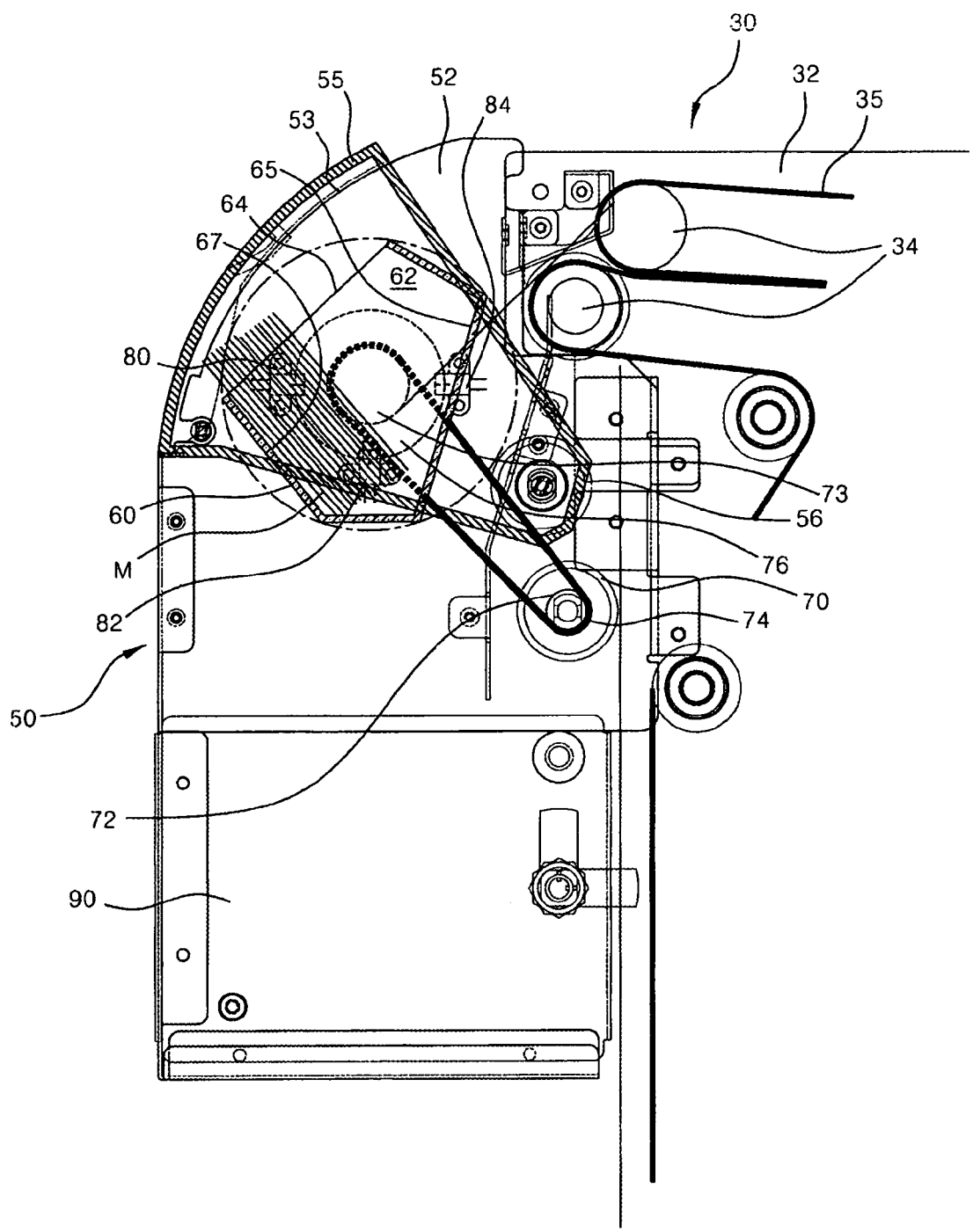

Meanwhile, when the customer has taken the media M from the accumulation box 60, the door 55 is closed to cover the entrance 53, and the accumulation box 60 is rotated back to the initial state. On the other hand, if the customer does not take the media M from the accumulation box 60 within a predetermined period of time, the door 55 is closed as shown in FIG. 5D.

Figure 5E:
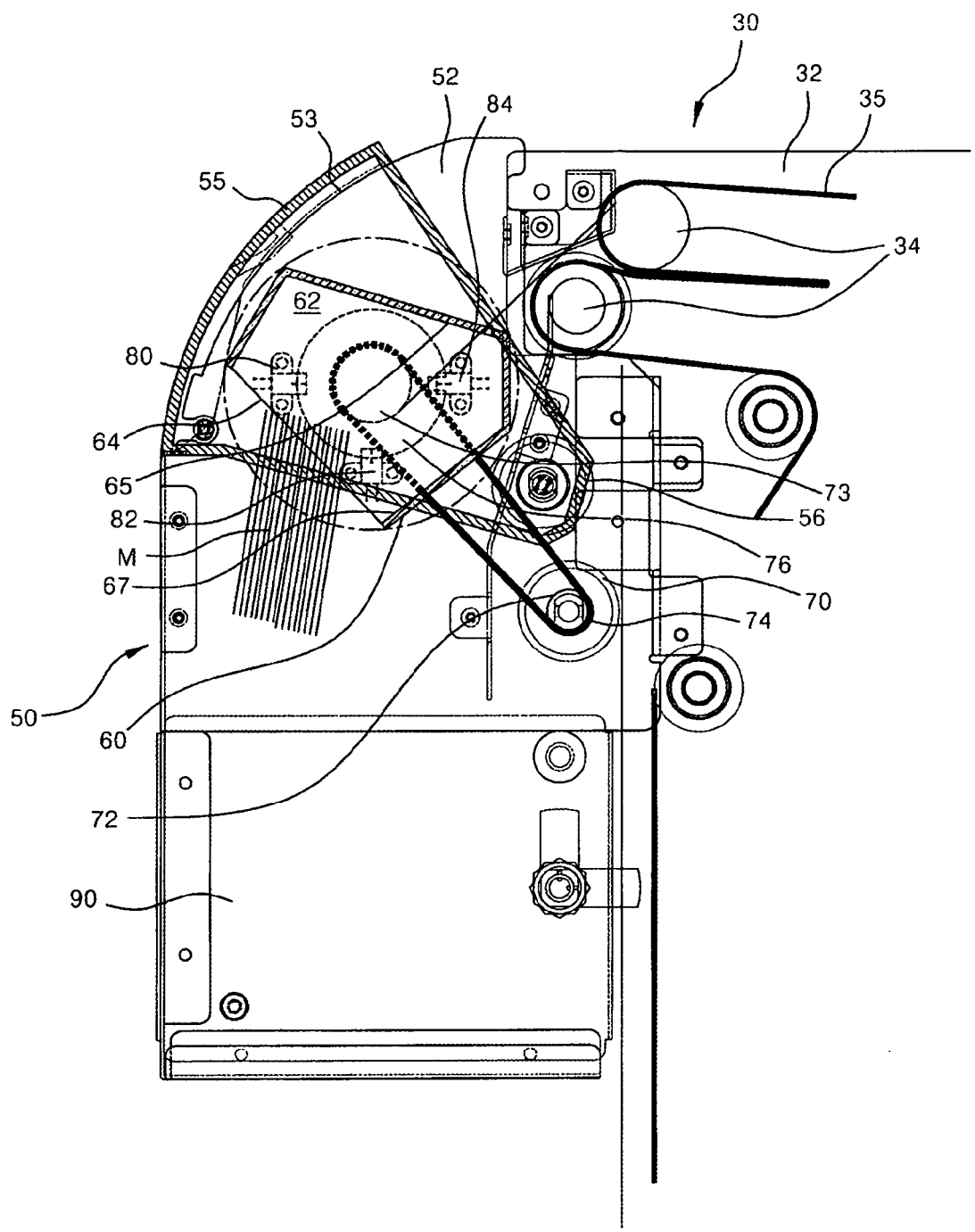

When the door 55 is closed, the motor 70 again rotates the accumulation box 60 counterclockwise. That is, the motor 70 is operated to rotate the accumulation box 60 until the sensor 84 detects the slot of the wheel 76. When the opening 64 of the accumulation box 60 is directed toward a top of the collector box 90, the media M that remain seated on the second accumulation surface 67 fall down due to their weight and enter the collector box 90, as shown in FIG. 5E. Since the motor 70 rotates the accumulation box 60 through at least 180 degrees, the accumulation box 60 is moved to positions in which the media can be accumulated, in which the customer can take the media M from the accumulation box 60, and in which the media M are collected in the collection box 90, respectively.

Figure 5F:
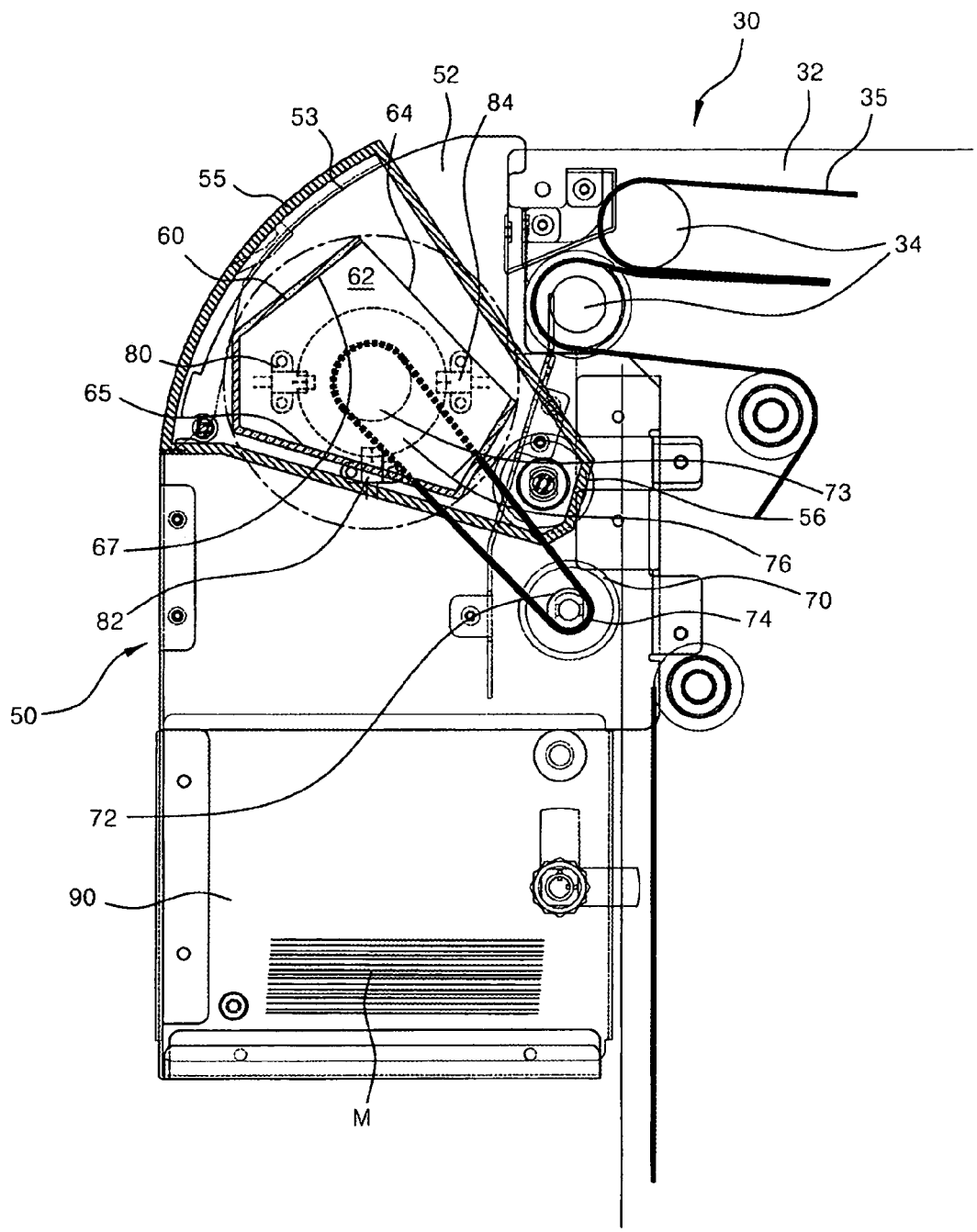

Thereafter, the motor 70 is continuously operated to rotate the accumulation box 60 counterclockwise until the accumulation box 60 returns to the initial position in which media M transferred from the delivery module 32 can be accumulated in the accumulation space 62. That is, the box motor 70 is operated until the sensor 80 detects the slot of the wheel 76, so that the opening 64 of the accumulation box 60 is in a state as shown in FIG. 5F. It will be apparent that the initial state can be established by rotating the accumulation box 60 clockwise from the state shown in FIG. 5E.

The invention solves at least the following problems associated with the related and prior art devices.

Embodiments of the invention provide a customer access module for a media dispenser wherein an operation of emptying media into a collector box can be more smoothly made with a reduced load.

Embodiments of the invention also provide a customer access module for a media dispenser capable of completely emptying even a small number of sheets of media into a collector box. That is, the media M can be completely transferred into the collector box since the accumulation box in which media are stacked can be rotated through 360 degrees.

Further, since the accumulation box is rotated about centers of side ends thereof and the driving force is transmitted through a belt mechanism, there is no load generated on the structure for rotating the accumulation box. In addition, since there is no load generated capable of distorting the accumulation box, a load exerted on the motor is minimized.

Moreover, there are advantages in that, since the accumulation box is driven by the belt, the problem of breakage resulting from gear engagement in the related art can be solved and it is possible to obtain a damping function due to tension of the belt.

Finally, there is an advantage in that since lateral sides of the media protrude from the accumulation box and are exposed to the customer by rotation of the accumulation box, the customer can more easily take the media.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A customer access module for a media dispenser, comprising:
   a frame defining an inner space;
   an accumulation receptacle rotatably installed within the space in the frame and comprising an opening configured to receive media therethrough and a first accumulation surface on which media are initially stacked upon receipt of media therein and a second accumulation surface on which media are stacked for customer access; and
   a driving source for providing a driving force for driving the accumulation receptacle.

2. The module as claimed in claim 1, wherein the driving unit comprises:
   a driving source configured to provide a driving force for rotating the accumulation receptacle; and
   a belt mechanism configured to receive the driving force from the box driving source and rotate the accumulation receptacle.

3. The module as claimed in claim 2, wherein the belt mechanism comprises:
   a driven pulley installed on the accumulation receptacle, a driving pulley installed on the driving source, and a belt for transmitting the driving force between the driving and driven pulleys.

4. The module as claimed in claim 1, further comprising a door configured to be selectively opened and closed to provide access by a user to the space.

5. The module as claimed in claim 1, wherein the accumulation receptacle is in the shape of a pentagon in cross-section.

6. The module as claimed in claim 1, wherein the second accumulation surface faces the first accumulation surface at a predetermined angle with respect thereto.

7. The module as claimed in claim 6, wherein a width w of the second accumulation surface is smaller than a width of the media.

8. The module as claimed in claim 1, further comprising a collector receptacle configured to collect media that have not been removed by a user from the module provided below the accumulation receptacle.

9. The module as claimed in claim 8, wherein the accumulation receptacle is configured to be rotated by the driving unit between a position in which the first accumulation surface faces in a direction in which the media are fed thereinto and a position in which the first accumulation surface faces the opening of the collector receptacle.

10. The module as claimed in claim 1, wherein the accumulation receptacle is configured to be rotated 360 degrees.

11. The module as claimed in claim 1, further comprising a wheel configured to be installed concentric with the driven pulley, and a plurality of sensors configured to detect rotational positions of the wheel provided on the frame.

12. An automated teller machine comprising the customer access module of claim 1.

13. A customer access module for a media dispenser, comprising:
    a frame defining an inner space;
    an accumulation receptacle rotatably installed within the space in the frame and comprising an opening configured to receive media therethrough, a first accumulation surface on which media are initially stacked, and a second accumulation surface facing the first accumulation surface at a predetermined angle with respect thereto, wherein the second accumulation surface is configured to prevent unauthorized access to the media disposed on the first accumulation surface; and
    a driving unit configured to rotate the accumulation receptacle.

14. The module as claimed in claim 13, wherein the driving unit comprises:
    a driving source configured to provide a driving force for rotating the accumulation receptacle; and
    a belt mechanism configured to receive the driving force from the box driving source and rotate the accumulation receptacle.

15. The module as claimed in claim 14, wherein the belt mechanism comprises:
    a driven pulley installed on the accumulation receptacle, a driving pulley installed on the driving source, and a belt for transmitting the driving force between the driving and driven pulleys.

16. The module as claimed in claim 13, further comprising a door configured to be selectively opened and closed to provide access by a user to the space.

17. The module as claimed in claim 13, wherein the accumulation receptacle is in the shape of a pentagon in cross-section.

18. The module as claimed in claim 13, wherein a width w of the second accumulation surface is smaller than a width of the media.

19. The module as claimed in claim 13, further comprising a collector receptacle configured to collect media that have not been removed by a user from the module provided below the accumulation receptacle.

20. The module as claimed in claim 19, wherein the accumulation receptacle is configured to be rotated by the driving unit between a position in which the first accumulation surface faces in a direction in which the media are fed thereinto and a position in which the first accumulation surface faces the opening of the collector receptacle.

21. The module as claimed in claim 13, wherein the accumulation receptacle is configured to be rotated 360 degrees.

22. The module as claimed in claim 13, further comprising a wheel configured to be installed concentric with the driven pulley, and a plurality of sensors configured to detect rotational positions of the wheel provided on the frame.

23. An automated teller machine comprising the customer access module of claim 13.

* * * * *